(12) United States Patent
Strassenburg-Kleciak et al.

(10) Patent No.: US 9,068,853 B2
(45) Date of Patent: Jun. 30, 2015

(54) NAVIGATION SYSTEM

(71) Applicant: Harman Becker Automotive Systems GmbH, Karlsbad (DE)

(72) Inventors: Marek Strassenburg-Kleciak, Garching (DE); Stavros Mitrakis, Kirchheim-Heimstetten (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 13/773,273

(22) Filed: Feb. 21, 2013

(65) Prior Publication Data

US 2013/0218465 A1 Aug. 22, 2013

(30) Foreign Application Priority Data

Feb. 22, 2012 (EP) ..................................... 12001179

(51) Int. Cl.
  *G01C 21/34* (2006.01)
  *G01C 21/32* (2006.01)
  *G09B 29/00* (2006.01)

(52) U.S. Cl.
  CPC ............ *G01C 21/3461* (2013.01); *G01C 21/32* (2013.01); *G01C 21/3446* (2013.01); *G09B 29/003* (2013.01)

(58) Field of Classification Search
  CPC ................................. G01C 21/18; G01C 21/34
  USPC .................................. 701/533, 431, 454, 461
  See application file for complete search history.

(56) References Cited

U.S. PATENT DOCUMENTS

| 6,622,085 | B1 * | 9/2003 | Amita et al. ............. 340/995.14 |
| 2007/0226243 | A1 * | 9/2007 | Fuki et al. ..................... 707/102 |
| 2011/0231086 | A1 | 9/2011 | Montealegre et al. |

FOREIGN PATENT DOCUMENTS

| DE | 41 04 351 A1 | 8/1991 | |
| EP | 0782058 A1 * | 7/1997 | ............... G05D 1/02 |
| EP | 1 227 302 | 7/2002 | |
| GB | 2 2443 472 | 5/2008 | |

OTHER PUBLICATIONS

E.Q.V. Martins et al, Deviation Algorithms for Ranking Shortest Paths, International Journal of Foundations of Computer Science, vol. 10, Issue 03, 2 pgs., Sep. 1999.
European Search Report from corresponding European Patent application No. 12001179.6, 7 pgs., Jul. 30, 2012.

(Continued)

*Primary Examiner* — Thomas G Black
*Assistant Examiner* — Luke Huynh
(74) *Attorney, Agent, or Firm* — Alleman Hall McCoy Russell & Tuttle LLP (57) ABSTRACT

A navigation system (NS) may include a processor that can retrieve geographic map data from a database, where the geographic map data includes polygonal chains. The processor can determine a straightness value, a length ratio, and/or an angle-to-length ratio for each of the polygonal chains based on segments and/or vertices of the polygonal chain. Also, a first class and a second class of the polygonal chains can be determined based on one or more of the three determined values for each of the polygonal chains. The first class may represent roads that are less winding than the second class, and such an attribute may be beneficial in selecting an optimal route.

20 Claims, 6 Drawing Sheets

(56) References Cited

OTHER PUBLICATIONS

E. Zimmermann, A method for determining a route on the basis of OpenStreetMap map data sets is known from "OpenStreetMap in ArcGIS: Automatisierte Datenaufbereitung für Netzwerkanalysen," Bachelor's Thesis, Karlsruhe University of Applied Sciences [Hochschule Karlsruhe], Jun. 30, 2010.

Hentschel, M. et al., "Autonomous Robot Navigation Based on OpenStreetMap Geodata," 13th International IEEE Conference on Intelligent Transportation Systems, Sep. 2010, 6 pages.

European Patent Office, Notice of Allowance Issued in Application No. 12001179.6, Mar. 20, 2015, Netherlands, 7 pages.

* cited by examiner

NAVIGATION SYSTEM

PRIORITY CLAIM

This application claims the benefit of priority from European Patent Application No. EP12001179.6, filed Feb. 22, 2012, which is incorporated by reference.

BACKGROUND OF THE INVENTION

1. Technical Field

The present invention relates to navigation systems.

2. Related Art

In the field of geographic information systems, graphs may be used for modeling transportation networks, power grids, and utility networks. Networks may be viewed as connected graphs that include a geometric and/or topological arrangement of vertices (nodes) and segment lines (edges).

SUMMARY

Navigation systems may use geographic map data for determining routes. Such route determinations may be based on geometric properties of roadways included in the geographic map data. A processing aspect of a navigation system (NS) can retrieve geographic map data from a database, and use that data to determine geometric properties of roadways represented in the data. The geometric properties may include graphs, such as polygonal chains, which can provide mathematical representations of roadways. For example, a polygonal chain can represent various lengths of a roadway and/or straightness of the roadway (such as a degree in which the roadway winds). Based on determined straightness and/or length properties of alternative roadways the system can select a route for transportation.

For example, a processor included in the NS can execute instructions stored in memory to retrieve geographic map data from a database, where the geographic map data includes polygonal chains. Each of the polygonal chains may include segments and vertices. The processor can determine a straightness value, a length ratio, and/or an angle-to-length ratio for each of the polygonal chains based on the segments and/or vertices. Also, a first class and a second class of the polygonal chains can be determined based on one or more of the three determined values for each of the polygonal chains. The first class may represent roads that are less winding than the second class, and such an attribute may be beneficial in selecting an optimal route. This functionality is especially useful in analyzing underdeveloped transportation infrastructures or underdeveloped geographic map data. It may be assumed that a winding road is more likely to be slower and more hazardous than a straighter road.

Other systems, methods, features and advantages may be, or may become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The NS may be better understood with reference to the following drawings and description. The components in the figures are not necessarily to scale, emphasis instead being placed upon illustrating the principles of the NS. Moreover, in the figures, like referenced numerals designate corresponding parts throughout the different views.

DETAILED DESCRIPTION

It is to be understood that the following description of examples of implementations are given only for the purpose of illustration and are not to be taken in a limiting sense. The partitioning of examples in function blocks, modules or units illustrated in the drawings is not to be construed as indicating that these function blocks, modules or units are necessarily implemented as physically separate devices or a single physical device. Functional blocks, modules or units illustrated or described may be implemented as separate devices, circuits, chips, functions, modules, or circuit elements. One or more functional blocks, modules, or units may also be implemented in a common circuit, chip, circuit element or device.

Described herein, is a navigation system (NS) that may include a processor, such as a central processing unit of a local or remote computer, that may retrieve geographic map data, such as data related to transportation networks. The geographic map data can be retrieved from a database, and the geographic map data can include graphs, such as polygonal chains. The processor can determine a straightness value, a length ratio, and/or an angle-to-length ratio for the retrieved graphs. These three types of determined values are described below in detail. Also, a first class and a second class of the graphs can be determined based on one or more of the three determined value types. The first class may represent roads that are less winding than the second class, and such an attribute may be beneficial in selecting an optimal route. This functionality is especially useful in analyzing underdeveloped transportation infrastructures or underdeveloped geographic map data. It may be assumed that a winding road is likely to be slower and more hazardous than a straighter road.

A graph, which may represent a network, may include vertices, segment lines, and a rule of assignment. Vertices and segment lines may be two disjoint sets of data. The rule of assignment, also known as an incidence map, may assign two vertices from a set of vertices to an individual segment line from a set of segment lines.

Transportation networks may be undirected networks, in which vertices that are joined to one another by a segment line are adjacent to one another. And a segment line is incident to its vertices. In graph theory, a degree of a vertex is understood to mean a number of its adjacent vertices (also known as neighbors). If a degree of a vertex is zero, it has no adjacent vertices and hence is isolated. In undirected graphs, a distinction is made between ways and paths. A path is a sequence of vertices in which vertices may also be visited multiple times. A vertex may only be traversed a maximum of one time. Vertices may be reachable from one another when a way exists between them. A complete graph is a network in which each vertex is connected to every other vertex by segment lines.

In networks, the segment lines can be evaluated by weights. An example of such a weight may be the length of a segment line, which may be referred to as a distance.

A "best ways" method of network analysis has the task of finding an optimal route between two given locations, where a definition of an optimal route can be define by a use or a developer, for example. An optimal route may be, for example, the shortest way in terms of distance, the shortest way in terms of time, or a topologically favorable way. The topologically favorable way, may be a way with the least number of segment lines to a destination, for example.

Algorithms, such as Dijkstra's algorithm (named after Edsger W. Dijkstra) may be used to calculate an optimal route. Such an algorithm may operate on a transportation network that is defined as a graph with weighted segment lines. The weights, which may be considered costs, are a distance between two vertices of a segment line and/or the average travel time, for example.

Routing may include a calculation of an optimal travel route between two or more locations in a transportation network. If a route passes through intermediate points, it may be referred to as route planning. During navigation of a vehicle for example, a current location of the vehicle may be determined using a GPS signal, and the optimal route within the transportation network may be determined based on the current location of the vehicle.

A geographic map data model, such as a data model for OPENSTREETMAP (OSM), may be a basis for a model of a geographic map database and/or for a predetermined format, such as an Extensible Markup Language (XML) format (such as .OSM that is used for storing and/or exchanging OSM data). In a geographic map data model, the model can include three data types: nodes, ways, and relations, which may be represented in a predetermined format, such as the OSM XML format by XML tags (<node>, <way>, <relation>), for example. Nodes may be used to represent objects with a point nature, such as anchor points of linear objects, and also points of interest. Ways may be used to create linear objects. Ways may be composed of a sequence of nodes, and in such a case, a way may be a polygonal chain. A polygonal may be a trace of a way that is composed of a finite number of line segments.

Using mathematic calculations, such as in geodesy calculations, polygonal chains may be measurement lines for terrestrial surveys. A polygonal chain may include polygon points (also known as vertices), polygon sides (also known as segment lines), and angles. The angles may be angles between two polygon sides adjacent to one another at a vertex.

In a geographic map model, the order of referenced nodes may indicate the direction of a way. Relations may be used to define relationships between different objects such as nodes, ways, or relations themselves. Nodes, ways, and relations that participate in a relation may be members of a geography map model. Relations may include turning rules, for example.

Node, way, and relation fields, such as XML tags for nodes, ways, and relations, may include attributes. For example, such XML tags may include XML attributes such as a tag identification attribute. Any number of tags can be assigned to a data type or field (such as node, way, and relation data types and fields). Geographic map model tags may be used to assign properties to nodes, ways, and relations, and may include a key (k) and/or value (v) pair. A value (v) is a value that relates to a corresponding key (k).

Ways such as roads may be recorded using a highway geographic map model tag. A road classification may be accomplished by a value of a highway key. To define a road, geographic map model tags may be used, for instance to assign a street name (a name geographic map model tag), a highway or route number and/or reference (a reference geographic map model tag), or access restrictions.

In the geographic map model format, nodes that include one way are anchor points. Nodes that include more than one way, such as junctions, are cross points. At a junction, it may be possible to change from one way to another way.

In an example operation of the NS, a computing unit, such as a central processing unit (CPU), of the NS may retrieve map data of a map section from a database of the NS or another system. The retrieved map data may include polygonal chains, and the polygonal chains may be stored in the database. Each polygonal chain may include vertices and segments.

The computing unit may determine a value of a parameter of a geometric property of the polygonal chains for one or more of the retrieved polygonal chains. The may be with respect to ways of the map section. The computing unit may also determine a first class of the polygonal chains and a second class of the polygonal chains from the map data by evaluation of parameter values.

In the operation, first segments of the polygonal chains of the first class may be assigned a first rank by the computing unit. Second segments of the polygonal chains of the second class may also be assigned a second rank by the computing unit. The first segments may include priority over the second segments for determining a route.

Alternatively or additionally, routing may be improved in map regions with inadequate attribute assignment. Also, map regions with and without attribute assignments can be used together in a route calculation.

The map data may be obtained from a geographic map model, such as the database OPENSTREETMAP. The map section may be generated automatically. The map section may be determined by the computing unit, for example, based on a starting point and a destination point of the route.

In a geographic map model, for example, the polygonal chains may be labeled as "ways," and may be organized by tags. The polygonal chains may be defined, such as in definitions stored in the database, so they need not be determined from the segments. Definitions of the polygonal chains in a database may be dependent on one another, and may be associated with polygonal chains.

The geometric properties of a polygonal chain may relate to a mathematical definition of a polygonal chain. Properties of a polygonal chain may be specified parameter values. Such properties may include vertices, segment lines, and angles between segment lines.

A length of a polygonal chain may be determined as a geometric property. For example, a sum of the lengths of segments may be determined as a parameter. In such an example, vector addition may not be utilized; instead, length of a segment may be calculated individually using the coordinates of two associated vertices. Each polygonal chain may be assigned to the first class or to the second class based on the length of the segment. A polygonal chain with a length greater than a first threshold may be assigned to the first class and a polygonal chain with a length less than the first threshold may be assigned to the second class. The first threshold may be defined manually or automatically. For example, the threshold may be defined so that a majority percentage (such as 90%) of the polygonal chains includes a length less than the first threshold. The first threshold as a function of density of the polygonal chains in the map section may also be calculated. This calculation as well as other calculations, evaluations, and determinations described herein may be performed by the computing unit.

A length ratio of lengths of a polygonal chain may be determined as a geometric property. Also, the length ratio of a distance between a first vertex and a last vertex to a length of a polygonal chain may be determined as a parameter. Further, the length of the polygonal chain may be determined by a sum of the lengths of segments. A polygonal chain may be assigned to the first class or the second class based on its length ratio.

Assignment of polygonal chains to a first class or to a second class may occur such that a polygonal chain with a ratio of lengths greater than a second threshold may be assigned to the first class and such that a polygonal chain with a ratio of lengths lesser than the second threshold may be assigned to the second class. The second threshold may be defined so that a certain percentage (such as 90%) of polygonal chains is likely to include a ratio of lengths less than the second threshold. The second threshold as a function of a density of polygonal chains in a map section may be calculated.

An angle sum of each polygonal chain may be determined as a geometric property. A sum of all angles between each pair of segments may be determined as a parameter. An angle of two segments that align may be specified as 180°. However, a definition may also include an angle of two segments that align as 0°. A polygonal chain may be assigned to the first class or to the second class based on a sum of the angles of the chain.

Assignment of polygonal chains to a first class or to a second class may occur such that a polygonal chain with an angle sum greater than a third threshold may be assigned to the first class and such that a polygonal chain with an angle sum lesser than the third threshold may be assigned to the second class. The third threshold may be defined so that a certain percentage (such as 90%) of polygonal chains is likely to include an angle sum less than the third threshold. The third threshold as a function of a density of polygonal chains in a map section may be calculated.

An average of the angles of each polygonal chain may be determined as a geometric property. Further, an average of all angles between two segments may be determined as a parameter. A polygonal chain may be assigned to the first class or to the second class based on the average of the angles that has been determined.

Assignment of polygonal chains to a first class or to a second class may occur such that a polygonal chain with an average of the angles greater than a fourth threshold may be assigned to the first class and such that a polygonal chain with an average of the angles lesser than the fourth threshold may be assigned to the second class. The fourth threshold may be defined so that a certain percentage (such as 85%) of polygonal chains is likely to include an average of the angles than the fourth threshold. The fourth threshold as a function of a density of polygonal chains in a map section may be calculated.

An angle-to-length ratio may be determined as a geometric property. Also, a ratio of an average of the angles to the length of the polygonal chain may be determined as a parameter. The length of the polygonal chain may be determined by the sum of the lengths of the segments. A polygonal chain may be assigned to the first class or to the second class based on the angle-to-length ratio.

Assignment of polygonal chains to a first class or to a second class may occur such that a polygonal chain with an angle-to-length ratio greater than a fifth threshold may be assigned to the first class and such that a polygonal chain with an angle-to-length ratio lesser than the fifth threshold may be assigned to the second class. The fifth threshold may be defined so that a certain percentage (such as 80%) of polygonal chains is likely to include an angle-to-length ratio less than the fifth threshold. The fifth threshold as a function of a density of polygonal chains in a map section may be calculated.

Values of at least two parameters of different geometric properties may be determined. The first class and the second class of the polygonal chains may be determined based on the at least two parameters. Accordingly, the polygonal chains of a map section may be assigned to the first class or to the second class based on the at least two parameters.

Assignment of a polygonal chain to the first or second number takes place by various operations. For example, a polygonal chain may be evaluated using a first parameter of the chain (such as a chain length) so that a polygonal chain with a first parameter less than the first threshold may be assigned to the second class. A polygonal chain that is not assigned to the second class, for example, has a first parameter greater than the first threshold, and may be evaluated with respect to a second parameter. For evaluating the second parameter (such as an angle-to-length ratio), the polygonal chain may be assigned to the first class if it has a second parameter greater than a second threshold, whereas the polygonal chain maybe assigned to the second class if it has second parameter less than the second threshold.

Figure 1:
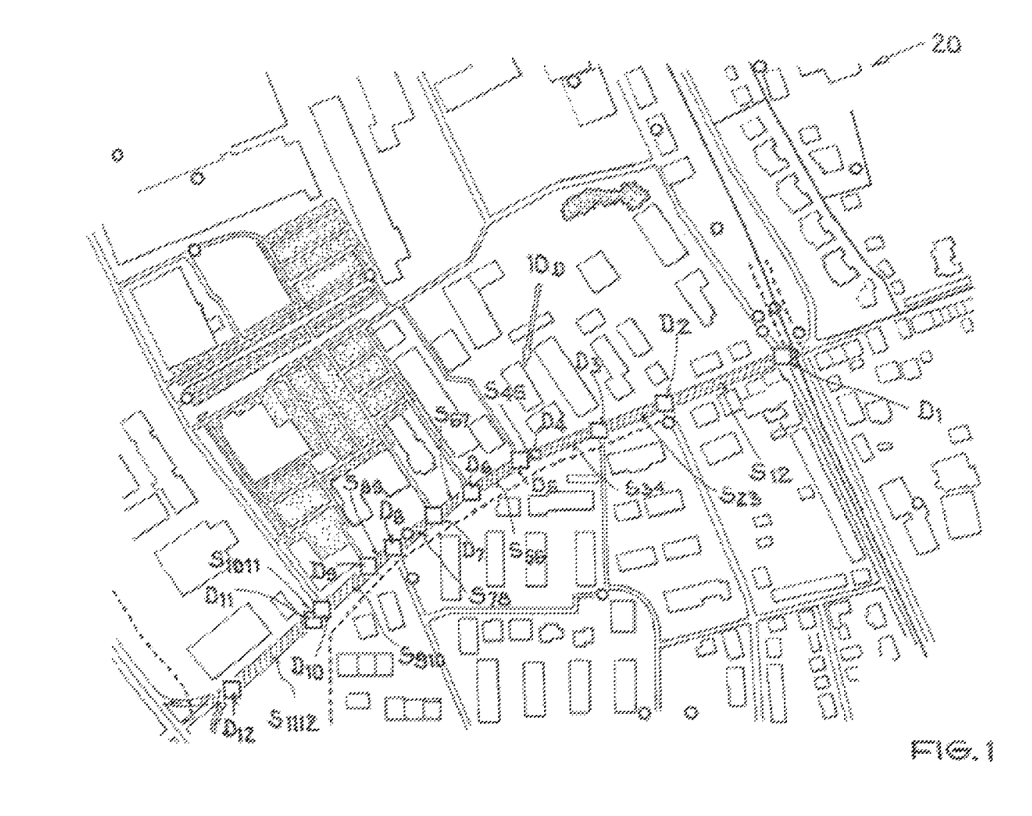
FIG. 1 illustrates an example map section.

An example map section 20 is depicted in FIG. 1. The map section 20 shows a road network, buildings, and other areas. Highlighted in the map section 20 is a polygonal chain 10D with vertices $D_1$, $D_2$, $D_3$, $D_4$, $D_5$, $D_6$, $D_7$, $D_8$, $D_9$, $D_{10}$, $D_{11}$, and $D_{12}$. The vertices $D_1$, $D_2$, $D_3$, $D_4$, $D_5$, $D_6$, $D_7$, $D_8$, $D_9$, $D_{10}$, $D_{11}$, and $D_{12}$ are connected to one another by segments $S_{12}$, $S_{23}$, $S_{34}$, $S_{45}$, $S_{56}$, $S_{67}$, $S_{78}$, $S_{89}$, $S_{910}$, $S_{1011}$, and $S_{1112}$.

A geographic map model contains a similar polygonal chain, which is labeled as a way and has an identification number. Database fields can be associated with the identification number. The vertices may also include corresponding identification numbers. Table 1 illustrates example database entries for the map section 20.

TABLE 1

| Tags: | highway = unknown<br>maxspeed = unknown<br>name = Maaßstraße |
|---|---|
| Nodes: | 266611432 (Also part of ways Maaßstraße (33056650), Adlerstraße (24516725), and Adlerstraße (30121020))<br>271359038 (Also part of way Haueckenweg (24972239))<br>262447883 (Also part of way Rutlindisweg (24972238))<br>262447884<br>275626000 (Also part of way 25304025)<br>273684848 (Also part of way 27639756)<br>277820615 (Also part of way 27639755)<br>262447886 (Also part of way Sandwingert (24504008))<br>269692032 (Also part of way 24824502)<br>266611424 (Also part of way Im Schuhmachergewann (24516724))<br>271355211 (Also part of way 24971899)<br>271355191 (Also part of ways 24971896, 99078476, and 24971897) |
| Part of: | Relation De_RNV_34 (48631)<br>Relation De_RNV_1009 (64577)<br>Relation De_RNV_M2 (62101) |

In Table 1, the attribute "highway" indicates that polygonal chain 10D is routable with the value of the "highway" key missing.

The map data of the map section 20 includes polygonal chains, which can be labeled as ways. The polygonal chains may be predefined. The polygonal chains may be stored as highways in a database. The segments may be referred to as line segments.

The polygonal chains that can be used for a route can be found from among the polygonal chains. In the routing process, roads with a higher level of prioritization usually are used with precedence for creating a route in an algorithm of the NS. If no attributes for the polygonal chains are present in a map section, the route may be determined in the algorithm without prioritization, which may be based on the weights or costs of the segments of the polygonal chains. Prioritization of roads may be based on straightness, length, bandwidth, physical condition, and/or traffic measurements of a road.

Navigation in a map section 20 without adequate attributes, such as attributes from road data of a geographic map model, may result in a query for a route by a default criteria (such as by the shortest route). Map sections without adequate attributes arise where information on map sections include vague satellite images without local map information, for example. In the case of map sections based on aerial or satellite images (or other recording aspects without local knowledge), it may be difficult for a user or algorithm to assign an attribute for prioritization to the polygonal chains. For example, attributes may be missing for districts or neighborhoods. An attribute may include that a recorded road has hazardous driving conditions.

Roads with a higher prioritization level, such as highway, frequently include a certain geometric property. For example, straight polygonal chains may be more likely to represent more important transport axes than short polygonal chains. Where representation of the streets associated with these polygonal chains is not determined and displayed, segments of these polygonal chains can be used for route calculation, as can segments with a higher level than neighboring streets, where the neighboring streets do not include a certain geometric property.

An assumption may be made in that connecting routes between neighborhoods or localities may be the first to be built in a transportation system. These connections may be longer and faster routes. Accordingly, associated polygonal chains may include corresponding geometric properties.

The map section 20 may be determined, for example, using regional data (such as city infrastructure data) in the map data. Also, the map section 20 using a street density per unit area (such as per square kilometer) may be determined.

An evaluation of geometric properties of the polygonal chains $10_A$, $10_B$, and $10_C$ by a number of parameters L, $V_L$, $\beta_S$, $\beta_M$, $V_\beta$, $\gamma_S$, and $\gamma_M$ is described with reference to FIGS. 2a, 2b, and 2c, respectively. Values for parameters L, $V_L$, $\beta_S$, $\beta_M$, $V_\beta$, $\gamma_S$, and $\gamma_M$ of geometric properties of the polygonal chains $10_A$, $10_B$, and $10_C$ may be determined by a computing unit, where the polygonal chains $10_A$, $10_B$, and $10_C$ in the map section 20 are without attributes.

Figure 2A:
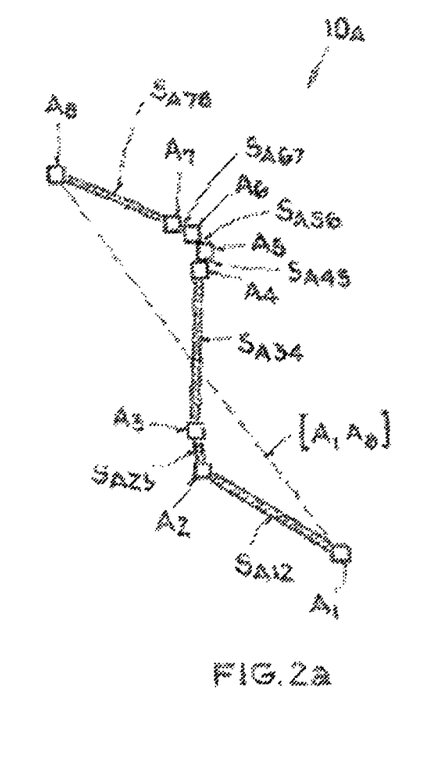
FIG. 2a illustrates an example polygonal chain.

FIG. 2a shows an example for a polygonal chain $10_A$. The polygonal chain $10_A$ of a way has a starting vertex $A_1$ and an ending vertex $A_8$ and anchor vertices $A_2$, $A_3$, $A_4$, $A_5$, $A_6$, and $A_7$ located between the starting vertex and the end vertex. The segments $S_{A12}$, $S_{A23}$, $S_{A34}$, $S_{A45}$, $S_{A56}$, $S_{A67}$, and $S_{A78}$ are defined between the vertices $A_1$, $A_2$, $A_3$, $A_4$, $A_5$, $A_6$, $A_7$, and $A_8$. In addition, the additional distance segment between the starting vertex $A_1$ and the ending vertex $A_8$ of the polygonal chain $10_A$ is sketched in the example from FIG. 2a.

The geometric property of the length L of the polygonal chain is illustrated using the polygonal chain $10_A$ in FIG. 2a.

With respect to FIG. 2a, the length L is the sum of the line segments of the polygon $10_A$, as described by equation (1).

$$L_{10A} = \overline{A_1A_2} + \overline{A_2A_3} + \overline{A_3A_4} + \overline{A_4A_5} + \overline{A_5A_6} + \overline{A_6A_7} + \overline{A_7A_8} \tag{1}$$

When the length L of all polygonal chains in the map section 20 is determined as the parameter L, then a minority percentage (such as 10%) of the longest polygonal chains, for example, can be assigned to a first class M and the remaining polygonal chains can be assigned to a second class N. This results in a threshold $th_L$, with the minority percentage and a majority percentage (such as 90%) associated with the first class M and the second class N, respectively.

With respect to FIG. 2a, a length ratio $V_L$ can be calculated by the equation (2).

$$V_L = \frac{\overline{A_1A_8}}{L_{10A}} \tag{2}$$

$L_{10A}$ is the length calculated by equation (1) of the polygonal chain and $\overline{A_1A_8}$ is the distance between the starting vertex $A_1$ and the end vertex $A_8$. The length ratio $V_L$ specifies the straightness of the road (such as the degree in which the road winds). Another threshold $th_{VL}$ may be compared against the length ratio $V_L$.

Figure 2B:
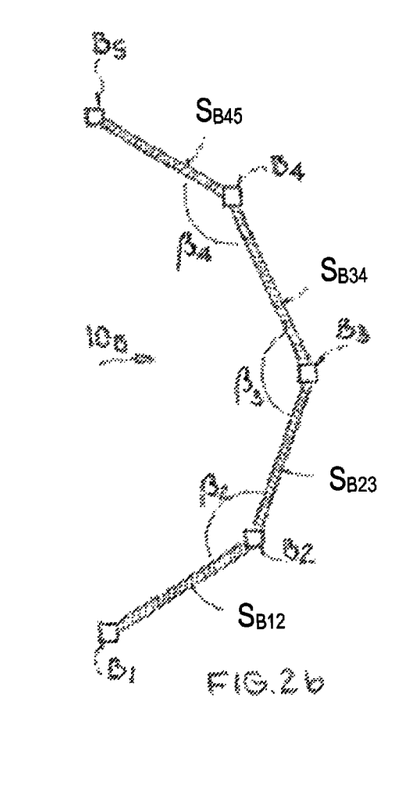
FIG. 2b illustrates an example polygonal chain.

Another polygonal chain $10_B$ is depicted in FIG. 2b. The polygonal chain $10_B$ of a way has a starting vertex $B_1$, an ending vertex $B_5$ and anchor vertices $B_2$, $B_3$, and $B_4$ located between the starting vertex and the ending vertex. The segments $S_{B12}$, $S_{B23}$, $S_{B34}$, and $S_{B45}$ are defined between the vertices $B_1$, $B_2$, $B_3$, $B_4$, and $B_5$. In addition, angles $\beta_1$, $\beta_2$, $\beta_3$, and $\beta_4$ between the segments $S_{B12}$, $S_{B23}$, $S_{B34}$, and $S_{B45}$ are depicted in FIG. 2b.

When the polygonal chain $10_A$ deviates from a straight line, at least one of the angles $\beta_2$, $\beta_3$, and $\beta_4$ is less than 180°. If the road is particularly contorted geometrically, the sum of the angles is correspondingly smaller as compared with a straighter road.

An angle sum $\beta_S$ in the example from FIG. 2a is:

$$\beta_S = \beta_1 + \beta_2 + \beta_3 + \beta_4 \tag{3}$$

The angle sum $\beta_S$ may be compared with another threshold $th_{\beta S}$. An angle average $\beta_M$ may be calculated by dividing the angle sum $\beta_S$ by the number of angles $K_\beta$.

$$\beta_M = \frac{\beta_S}{K_\beta} \tag{4}$$

Where the average $\beta_M$ of the angles of all polygons in the map section 20 may be determined, a minority percentage (such as 10%) of the polygonal chains with a large average $\beta_M$ of the angles can be assigned to a first class M and the remaining polygonal chains can be assigned to a second class N. This results in a threshold $th_{\beta M}$ in which the minority percentage of polygonal chains are associated with the first class M and a majority percentage (such as 90%) are associated with the second class N.

A third number and a fourth number with a further subdivision may also be provided.

A ratio $V_\beta$ may also be calculated by dividing the angle average $\beta_M$ by the length L of the polygon.

$$V_\beta = \frac{\beta_M}{L} \tag{5}$$

A length L may be determined by an equation, such as equation (6).

$$L = \overline{B_1B_2} + \overline{B_2B_3} + \overline{B_3B_4} + \overline{B_4B_5} \tag{6}$$

Parameter $V_\beta$ may be compared with another threshold $th_{V\beta}$.

Figure 2C:
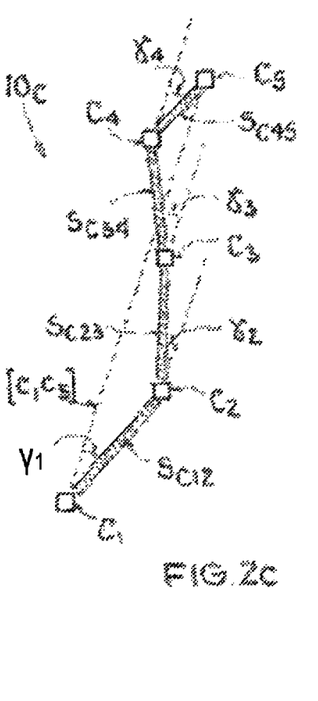
FIG. 2c illustrates an example polygonal chain.

Another polygonal chain $10c$ is depicted in FIG. 2c. The polygonal chain $10_C$ of a way has a starting vertex $C_1$ and an ending vertex $C_5$ and anchor vertices $C_2$, $C_3$, and $C_4$ located between the starting vertex and the ending vertex $C_5$. The segments $S_{C12}$, $S_{C23}$, $S_{C34}$, and $S_{C45}$ are defined between the vertices $C_1$, $C_2$, $C_3$, $C_4$, and $C_5$. In addition, an additional line segment $[c_1 \, c_5]$ is depicted between the starting vertex $C_1$ and the ending vertex $C_5$ in FIG. 2c.

In FIG. 2c, depicted are angular deviations $\gamma_1$, $\gamma_2$, $\gamma_3$, and $\gamma_4$ from the direction of the line segment $[C_1 \, C_5]$ that may be determined for each segment $S_{C12}$, $S_{C23}$, $S_{C34}$, and $S_{C45}$. A sum $\gamma_S$ of the angular deviations, such as deviations $\gamma_1$, $\gamma_2$, $\gamma_3$, and $\gamma_4$, can be calculated in an equation, such as equation 7.

$$\gamma_S = \gamma_1 + \gamma_2 + \gamma_3 + \gamma_4 \quad (7)$$

The parameter $\gamma_S$ may be compared with another threshold $th\gamma_S$.

Also, an average of angular deviations $\gamma_M$ can be determined by dividing sum $\gamma_S$ by the number of deviations $K_\gamma$.

$$\gamma_M = \frac{\gamma_S}{K_\gamma} \quad (8)$$

If the average $\gamma_M$ of the angular deviations of polygons in the map section may be determined, then a minority percentage (such as 15%) of the polygonal chains with the largest average $\gamma_M$ of the angle can be assigned to a first class M, and the remaining polygonal chains can be assigned to a second class N. This results in a threshold $th_{\gamma S}$ or $th_{\gamma M}$ in which the minority percentage of polygonal chains are associated with the first class M and a majority percentage of chains (such as 85%) are associated with the second class N. A third number and a fourth number with a further subdivision using additional thresholds may also be provided.

Figure 3:
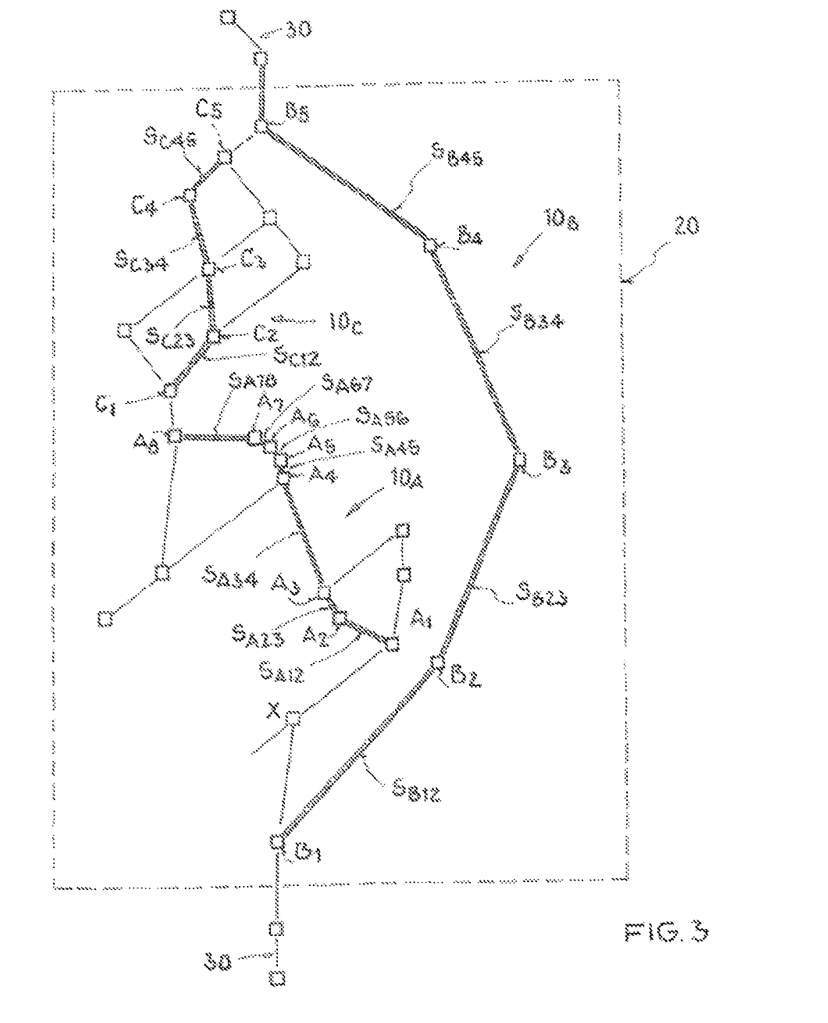
FIG. 3 illustrates an example road network.

FIG. 3 shows a map section 20 with multiple polygonal chains $10_A$, $10_B$, and $10_C$. Based on one or more of the parameters L, $V_L$, $\beta_S$, $\beta_M$, $V_\beta$, $\gamma_S$, and $\gamma_M$ discussed with reference to FIGS. 2a, 2b, 2c, a first number M of polygonal chains $10_B$ and a second class N of polygonal chains $10_A$, $10_C$ may be determined from map data through evaluation of the values of the parameters L, $V_L$, $\beta_S$, $\beta_M$, $V_\beta$, $\gamma_S$, and $\gamma_M$ that may be used. In this process, a multi-step evaluation may be used, for example, using the parameters L, $V_L$, $\beta_S$, $\beta_M$, $V_\beta$, $\gamma_S$, and $\gamma_M$ in that, for instance, the polygonal chains $10_A$, $10_B$, and $10_C$ that are longer than 70% of the polygonal chains may be determined in a first step by means of the parameter length L of the polygonal chains. And in a second step after that, the remaining 30% of the polygonal chains $10_A$, $10_B$, and $10_C$ may be evaluated with respect to the parameter $V_\beta$ of the ratio $V_\beta$ of the angle average $\beta_M$ to the length L.

In the example from FIG. 3, only the polygonal chain $10_B$ has a value of the ratio $V_\beta$ greater than a threshold $th_{V\beta}$. Accordingly, only the polygonal chain $10_B$ may be assigned to the first class M.

Subsequently, first segments $S_{B12}$, $S_{B23}$, $S_{B34}$, and $S_{B45}$ of the polygonal chain $10_B$ of the first class M may be assigned a first rank R=2. Second segments $S_{A12}$, $S_{A23}$, $S_{A34}$, $S_{A45}$, $S_{A56}$, $S_{A67}$, $S_{C12}$, $S_{C23}$, $S_{C34}$, and $S_{C45}$ of the polygonal chains $10_A$ and $10_C$ of the second class N may be assigned a second rank R=1. In the example from FIG. 3, the polygonal chain $10_B$ is an optimal bypass road. In contrast, the polygonal chains $10_A$, $10_C$ are relatively long streets through town and may be accorded lower priority for optimization of a route 30.

After the assignment of the polygonal chains $10_A$, $10_B$, and $10_C$ to the first class M with the first rank R=2 and the second class N with the second rank R=1, a route calculation takes place as a function of the rank R of the segments $S_{B12}$, $S_{B23}$, $S_{B34}$, and $S_{B45}$, or $S_{A12}$, $S_{A23}$, $S_{A34}$, $S_{A45}$, $S_{A56}$, $S_{A67}$, $S_{C12}$, $S_{C23}$, $S_{C34}$, and $S_{C45}$ of the polygonal chains $10_A$, $10_B$, and $10_C$. In this example, the first segments $S_{B12}$, $S_{B23}$, $S_{B34}$, and $S_{B45}$ include priority over the second segments $S_{A12}$, $S_{A23}$, $S_{A34}$, $S_{A45}$, $S_{A56}$, $S_{A67}$, $S_{C12}$, $S_{C23}$, $S_{C34}$, and $S_{C45}$ for determining the route 30.

Figure 4:
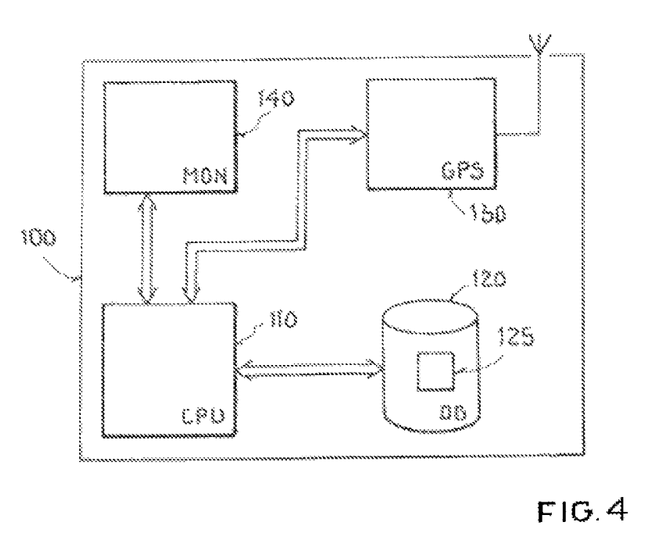
FIG. 4 illustrates an example block diagram of an example NS.

An example block diagram of an example navigation system 100 is depicted in FIG. 4. The navigation system 100 may be associated with or embedded in an electronic device attached to or embedded in a vehicle, for example. The navigation system 100 has a computing unit 110, which is connected to a database 120 that contains map data 125, such as map data for the map section 20. In addition, the computing unit 110 is connected to a display 140, for example a touchscreen, and to a positioning unit 130, for example a GPS. As depicted, the GPS is connected to an antenna.

The map data 125 may include determined polygonal chains. Each polygonal chain may include vertices, such as chains $10_A$, $10_B$, $10_C$, and $10_D$ including vertices $A_1$-$A_8$, $B_1$-$B_5$, $C_1$-$C_5$, and $D_1$-$D_{12}$, respectively. The vertices may include respective starting vertices, ending vertices, and anchor vertices located between the starting and ending vertices. Each polygonal chain may also has segments, such as segments $S_{A12}$-$S_{A78}$, $S_{B12}$-$S_{B45}$, $S_{C12}$-$S_{C45}$, and $S_{12}$-$S_{1112}$ depicted in FIGS. 1, 2a, 2b, 2c and 3.

The computing unit 110 may be configured to carry out an operation for navigation, which is explained with reference to the example flowchart in FIG. 5.

Figure 5:
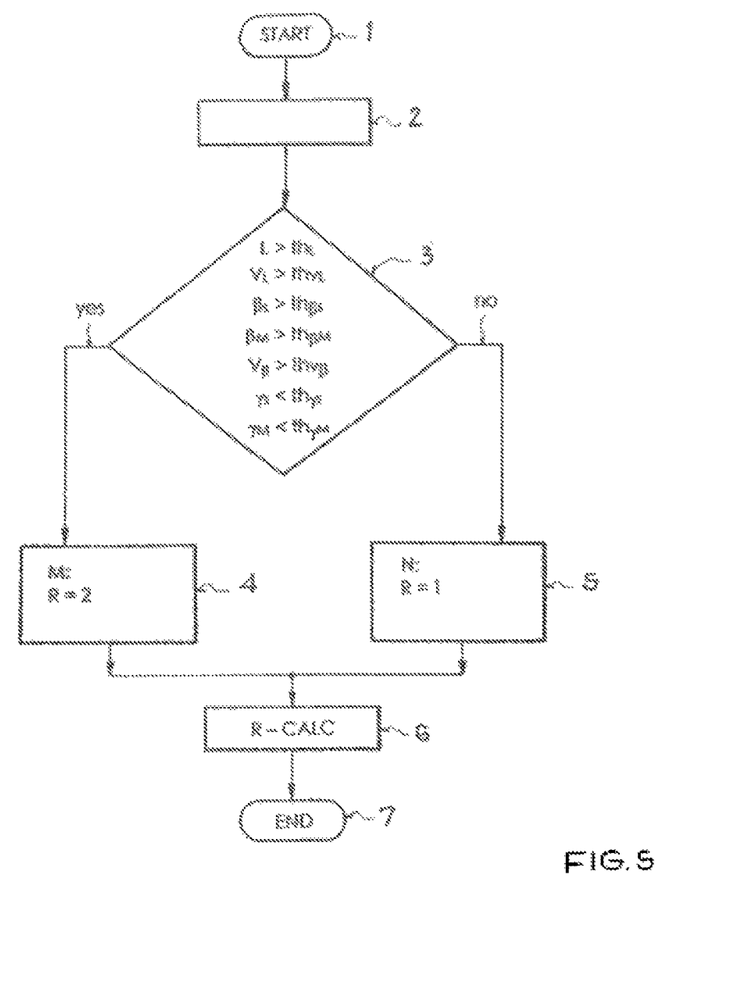
FIG. 5 illustrates an example flowchart associated with an example NS.

At 2 in FIG. 5, a processing aspect, such as computing unit 110, may determine one or more respective values of one or more parameters L, $V_L$, $\beta_S$, $\beta_M$, $V_\beta$, $\gamma_S$, and $\gamma_M$ of a geometric property of polygonal chains, such as of chains $10_A$, $10_B$, $10_C$, and $10_D$.

The processing aspect may determine, from map data, such as the map data 125, a first number M of polygonal chains at 4, such as of chains $10_B$, and a second class N of polygonal chains at 5, such as of chains $10_A$, and $10_C$. The one or more respective values of the one or more parameters L, $V_L$, $\beta_S$, $\beta_M$, $V_\beta$, $\gamma_S$, and $\gamma_M$ may be evaluated at 3. The determination at 4 and 5 may be based on the evaluation at 3. In the evaluation, one or more of parameters L, $V_L$, $\beta_S$, $\beta_M$, $V_\beta$, $\gamma_S$, and $\gamma_M$ may be compared to a corresponding threshold $th_L$, $th_{VL}$, $th_{\beta S}$, $th_{V\beta}$, $th_{\gamma S}$, and $th_{\gamma M}$. The threshold comparisons may be advantageously combined with one another by using Boolean operands, for example.

The computing unit 110 may be configured to assign a first rank R=2 to first segments, such as segments $\{S_{B12} \ldots S_{B45}\}$ of the polygonal chains 10s of the first class M, and a second rank R=1 to second segments, such as segments $\{S_{A12} \ldots S_{A78}\}$ and $\{S_{C12} \ldots S_{C45}\}$ of the polygonal chains $10_A$ and $10_C$ of the second class N. The first rank R=2 corresponds to a level two classification and/or condition of a way, for example. The second rank R=1 corresponds to a level one classification and/or condition of a way, for example.

The computing unit 110 may be configured to carry out a route calculation based on the rank R of the segments at 6, and at 7, a route of the calculation may be outputted, such as outputted to the display 140. For example, the route 30 to a destination address that has been entered may be calculated starting from a current position of a user, which may be determined by means of the position finding unit 130. The computing unit 110 may be configured to use the first segments $\{S_{B12} \ldots S_{B45}\}$ with priority over the second segments $\{S_{A12} \ldots S_{A78}\}$ and $\{S_{C12} \ldots S_{C45}\}$ when calculating a route.

As mentioned, different geometric properties of polygonal chains may be evaluated. A database of the geographic map model may be located in memory embedded in a system embedded in a vehicle or located at a central server accessible via a communication network, for example.

| List of Reference Characters | |
|---|---|
| $10_A$, $10_B$, $10_C$, $10_D$ | Polygonal chain (such as a highway) |
| 20 | Map section |
| 30 | Route |
| 100 | Navigation system |
| 110, CPU | Computing unit |
| 120, DB | Database |
| 130, GPS | Position finding unit (such as a GPS receiver) |
| 140, MON | Display (such as a touchscreen) |
| $A_1$-$A_8$, $B_1$-$B_5$, $C_1$-$C_5$, and $D_1$-$D_{12}$ | Vertices |
| $S_{A12}$ to $S_{A78}$, $S_{B12}$ $S_{B45}$, $S_{C12}$ to $S_{C45}$, and $S_{12}$ to $S_{1112}$ | Segments |
| [A1 A8]/[C1 C5] | Additional line segments/Distances |
| $\beta_2$, $\beta_3$, $\beta_4$, $\gamma_1$, $\gamma_2$, $\gamma_3$, and $\gamma_4$ | Angles |
| L, $V_L$, $\beta_S$, $\beta_M$, $V\beta$, $\gamma_S$, and $\gamma_M$ | Parameters |
| $th_L$, $th_{VL}$, $th_{\beta S}$, $th_{VB}$, $th_{YS}$, and $th_{YM}$ | Thresholds |
| R | Rank |

Figure 6:
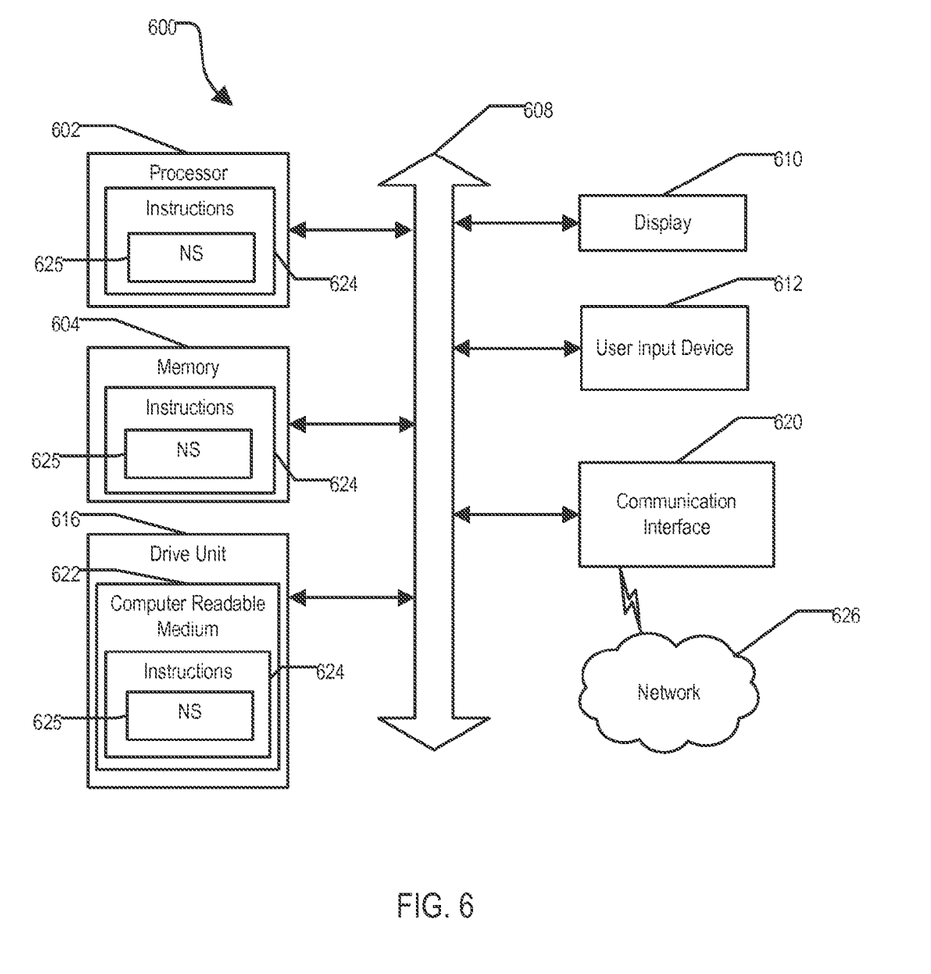
FIG. 6 illustrates an example block diagram of an example computer system that may be included or used with an aspect of an example NS.

Furthermore, the NS, one or more aspects of the NS, or any other device or NS operating in conjunction with the NS may include a portion or all of one or more computing devices of various kinds, such as the computer system 600 in FIG. 6. The computer system 600 may include a set of instructions that can be executed to cause the computer system 600 to perform any one or more of the methods or computer based functions disclosed herein. The computer system 600 may operate as a standalone device or may be connected, such as, using a network, to other computer systems or peripheral devices.

The computer system 600 may be implemented using electronic devices that provide voice, audio, video or data communication. While a single computer system 600 is illustrated, the term "system" may include any collection of systems or sub-systems that individually or jointly execute a set, or multiple sets, of instructions to perform one or more computer functions.

The computer system 600 may include a processor 602, such as a central processing unit (CPU), a graphics processing device (GPU), a digital signal processor, or some combination of different or the same processors. The processor 602 may be a component in a variety of systems. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually or programmed.

The term "module" may be defined to include a plurality of executable modules. The modules may include software, hardware, firmware, or some combination thereof executable by a processor, such as processor 602. Software modules may include instructions stored in memory, such as memory 604, or another memory device, that may be executable by the processor 602 or other processor. Hardware modules may include various devices, components, circuits, gates, circuit boards, and the like that are executable, directed, or controlled for performance by the processor 602.

The computer system 600 may include a memory 604, such as a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 604 includes a cache or random access memory for the processor 602. In alternative examples, the memory 604 may be separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described may be performed by the programmed processor 602 executing the instructions stored in the memory 604. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 600 may be in communication with, may include, or may not further include a display device 610, such as a liquid crystal display (LCD), an organic light emitting diode (OLED), a flat panel display, a solid state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive device 616.

The computer system 600 may include an input device 612 configured to allow a user to interact with any of the components of computer system. The input device 612 may be a keypad, a keyboard, or a cursor control device, such as a mouse, or a joystick, touch screen display, remote control or any other device operative to interact with the computer system 600. For example, a user of a navigation system may input criteria or conditions to be considered by a navigation device in calculating a route using the input device 612.

The computer system 600 may include a disk or optical drive device 616. The disk drive device 616 may include a computer-readable medium 622 in which one or more sets of instructions 624 or software can be embedded. The instructions 624 may embody one or more of the methods or logic described herein, including aspects of the NS 625. The instructions 624 may reside completely, or partially, within the memory 604 or within the processor 602 during execution by the computer system 600. The memory 604 and the processor 602 also may include computer-readable media as discussed above.

The computer system 600 may include computer-readable medium that includes instructions 624 or receives and executes instructions 624 responsive to a propagated signal so that a device connected to a network 626 can communicate voice, video, audio, images or any other data over the network 626. The instructions 624 may be transmitted or received over the network 626 via a communication port or interface 620, or using a bus 608. The communication port or interface 620 may be a part of the processor 602 or may be a separate component. The communication port 620 may be created in software or may be a physical connection in hardware. The communication port 620 may be configured to connect with a network 626, external media, the display 610, or any other components in the computer system 600, or combinations thereof.

The term "computer-readable medium" may include a single storage medium or multiple storage media, such as a centralized or distributed database, or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In alternative examples, dedicated hardware implementations, such as application specific integrated circuits, programmable logic arrays and other hardware devices, may be constructed to implement various aspects of the NS. One or more examples described may implement functions using two or more specific interconnected hardware modules or devices with related control and data signals that can be communicated between and through modules, or as portions of an application-specific integrated circuit. The NS may encompass software, firmware, and hardware implementations.

The NS described may be implemented by software programs executable by a computer system. Implementations can include distributed processing, component/object distributed processing, and parallel processing. Alternatively, virtual computer system processing can be constructed to implement various aspects of the NS.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the NS have been described, it may be apparent to those of ordinary skill in the art that many more embodiments and implementations are possible within the scope of the invention. For example, much of the above description presents aspects utilized by brightness adjustment systems of vehicle surround view systems; however, other types of systems may utilize these aspects and other aspects of the NS as well. Accordingly, the invention is not to be restricted except in light of the attached claims and their equivalents.

We claim:

1. A method, comprising:
    retrieving, by a processor of a navigation system, geographic map data from a database, where the geographic map data includes at least two polygonal chains, where each of the at least two polygonal chains includes segments;
    determining, by the processor, a straightness value for each of the at least two polygonal chains;
    determining, by the processor, a first class and a second class of the at least two polygonal chains based on the straightness value for each of the at least two polygonal chains, the first class including a lower range of straightness values than that of the second class;
    determining, by the processor, a route to a destination based on the determined class of the first class and the second class of the at least two polygonal chains; and
    displaying the determined route on a display of the navigation system.

2. The method of claim 1, further comprising determining, by the processor, respective ranks for the first class and the second class of the at least two polygonal chains.

3. The method of claim 2, wherein determining, by the processor, the route to the destination based on the determined class of the at least two polygonal chains comprises determining, by the processor, the route based on the respective ranks.

4. The method of claim 1, where the straightness value for each of the at least two polygonal chains is an angle sum.

5. The method of claim 4, where the angle sum is a sum of each angle between each pair of adjacent segments of a polygonal chain.

6. The method of claim 4, where the angle sum is a sum of one or more angles between one or more pairs of adjacent segments of a polygonal chain.

7. The method of claim 4, wherein determining, by the processor, the route to the destination based on the determined class of the at least two polygonal chains comprises determining, by the processor, the route including a polygonal chain from the first class.

8. A method, comprising:
    retrieving, by a processor of a navigation system, geographic map data from a database, where the geographic map data includes at least two polygonal chains, where each of the at least two polygonal chains includes segments;
    determining, by the processor, a length ratio for each of the at least two polygonal chains;
    determining, by the processor, a first class and a second class of the at least two polygonal chains based on the length ratio for each of the at least two polygonal chains, the first class including a lower range of length ratios than that of the second class;
    determining, by the processor, a route to a destination based on the determined class of the first class and the second class of the at least two polygonal chains; and
    displaying the determined route on a display of the navigation system.

9. The method of claim 8, further comprising determining, by the processor, respective ranks for the first class and the second class of the at least two polygonal chains.

10. The method of claim 9, wherein determining, by the processor, the route to the destination based on the determined class of the at least two polygonal chains comprises determining, by the processor, the route based on the respective ranks.

11. The method of claim 8, further comprising calculating the length ratio for each of the at least two polygonal chains based on a length of a segment directly connecting a starting vertex and an ending vertex of a polygonal chain and a sum of each segment length of the polygonal chain.

12. The method of claim 11, where the calculating of the length ratio for each of the at least two polygonal chains includes dividing the sum of each segment length of the polygonal chain by the length of the segment directly connecting the starting vertex and the ending vertex of the polygonal chain.

13. The method of claim 12, wherein determining, by the processor, the route to the destination based on the determined class of the at least two polygonal chains comprises determining, by the processor, the route including a polygonal chain from the first class.

14. A method, comprising:
retrieving, by a processor of a navigation system, geographic map data from a database, where the geographic map data includes at least two polygonal chains, where each of the at least two polygonal chains includes segments;
determining, by the processor, an angle-to-length ratio for each of the at least two polygonal chains;
determining, by the processor, a first class and a second class of the at least two polygonal chains based on the angle-to-length ratio for each of the at least two polygonal chains, the first class including a lower range of angle-to-length ratios than that of the second class;
determining, by the processor, a route to a destination based on the determined class of the first class and the second class of the at least two polygonal chains; and
displaying the determined route on a display of the navigation system.

15. The method of claim 14, further comprising determining, by the processor, respective ranks for the first class and the second class of the at least two polygonal chains.

16. The method of claim 15, wherein determining, by the processor, the route to the destination based on the determined class of the at least two polygonal chains comprises determining, by the processor, the route based on the respective ranks.

17. The method of claim 14, further comprising calculating the angle-to-length ratio for each of the at least two polygonal chains based at least on an angle sum of a polygonal chain.

18. The method of claim 17, further comprising calculating the angle-to-length ratio for each of the at least two polygonal chains further based on a length of a segment directly connecting a starting vertex and an ending vertex of the polygonal chain.

19. The method of claim 17, further comprising calculating the angle-to-length ratio for each of the at least two polygonal chains further based on a sum of each segment length of the polygonal chain.

20. The method of claim 14, further comprising calculating the angle-to-length ratio for each of the at least two polygonal chains based at least on an average angle of a polygonal chain, the average angle calculated by dividing the angle sum by a number of intermediate vertices of the polygonal chain.

* * * * *